Sept. 25, 1945.   H. A. WAGNER ET AL   2,385,748
VEHICLE MOUNTED TOWER
Filed Oct. 19, 1943   3 Sheets-Sheet 3
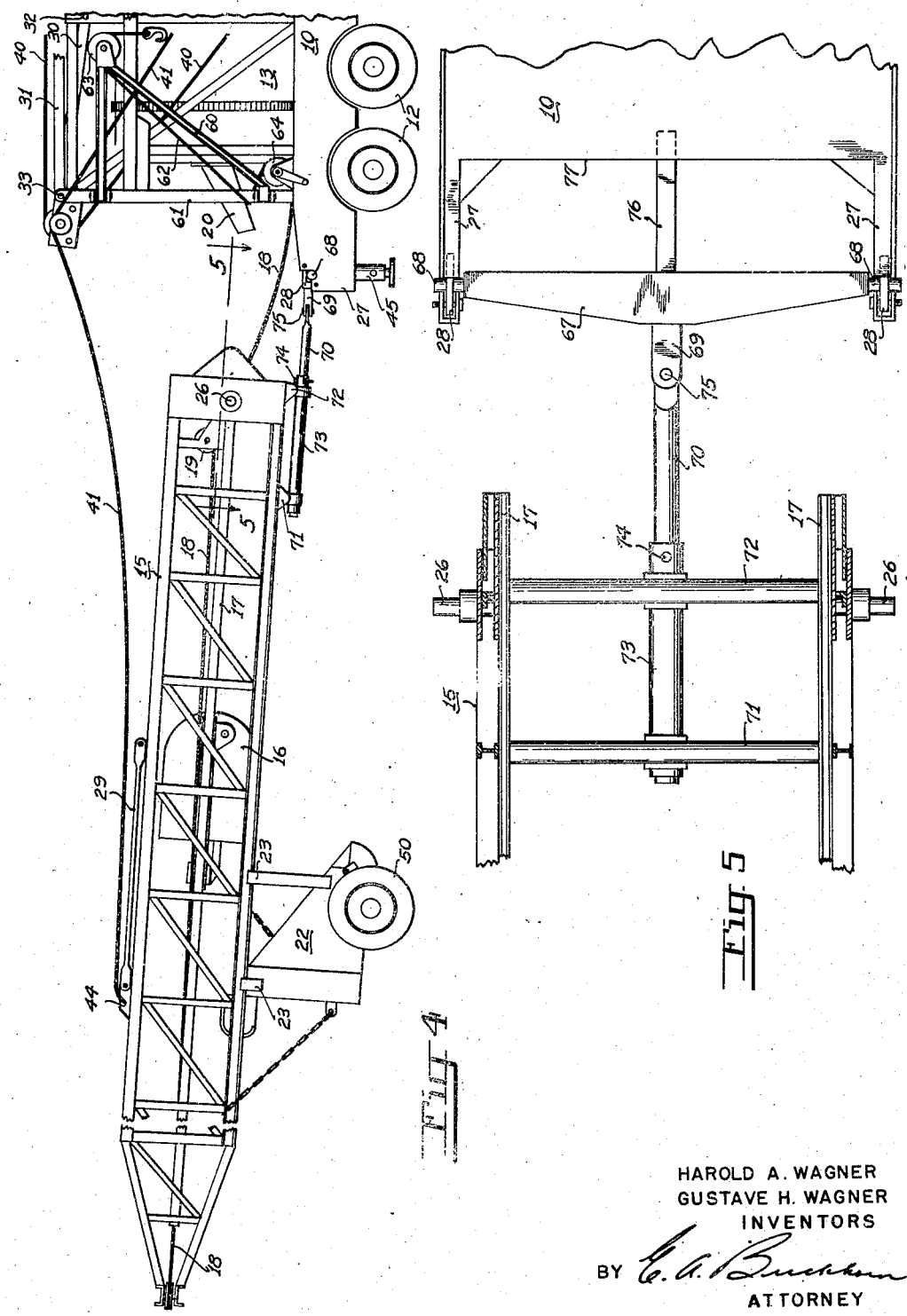
HAROLD A. WAGNER
GUSTAVE H. WAGNER
INVENTORS
BY
ATTORNEY Patented Sept. 25, 1945

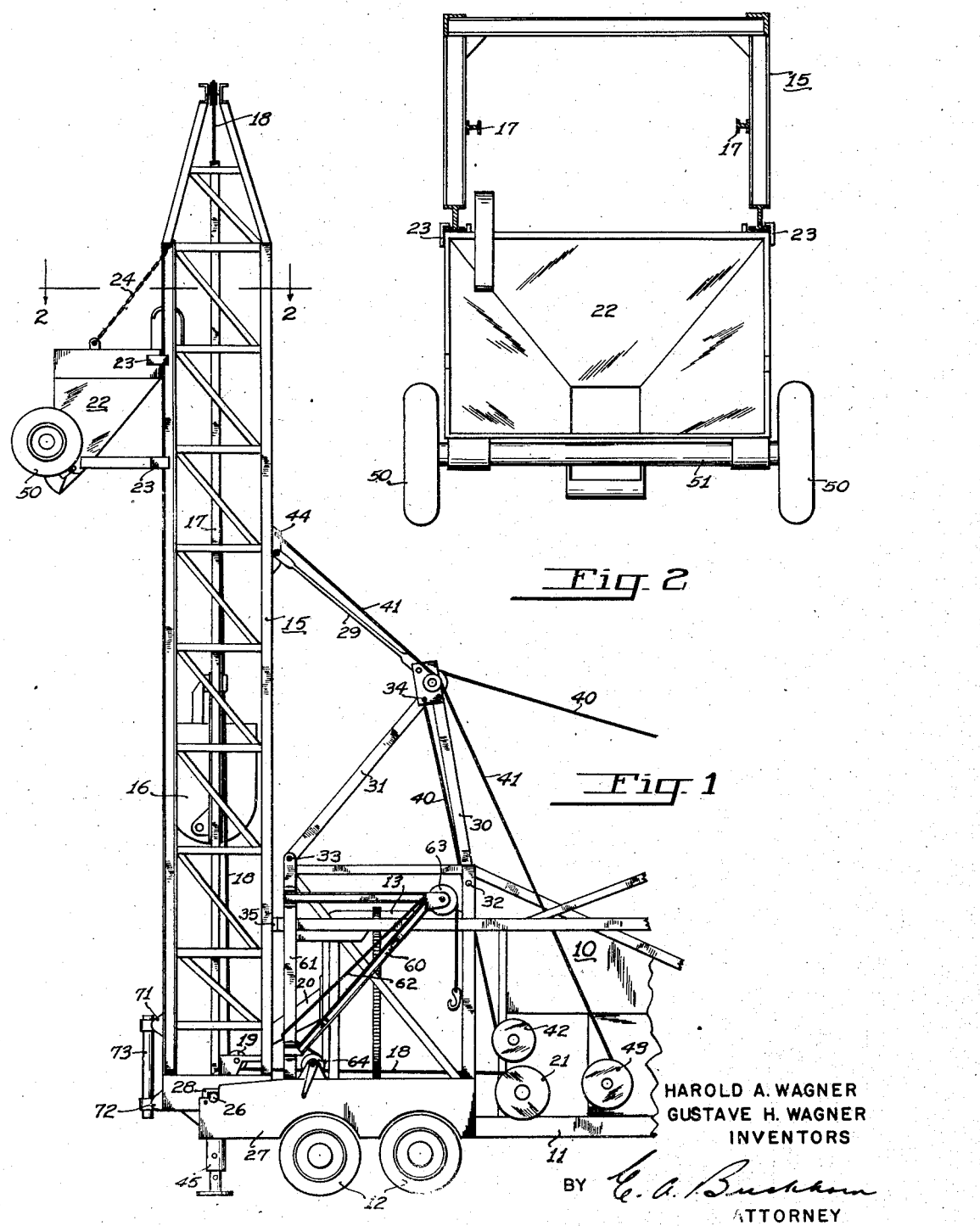

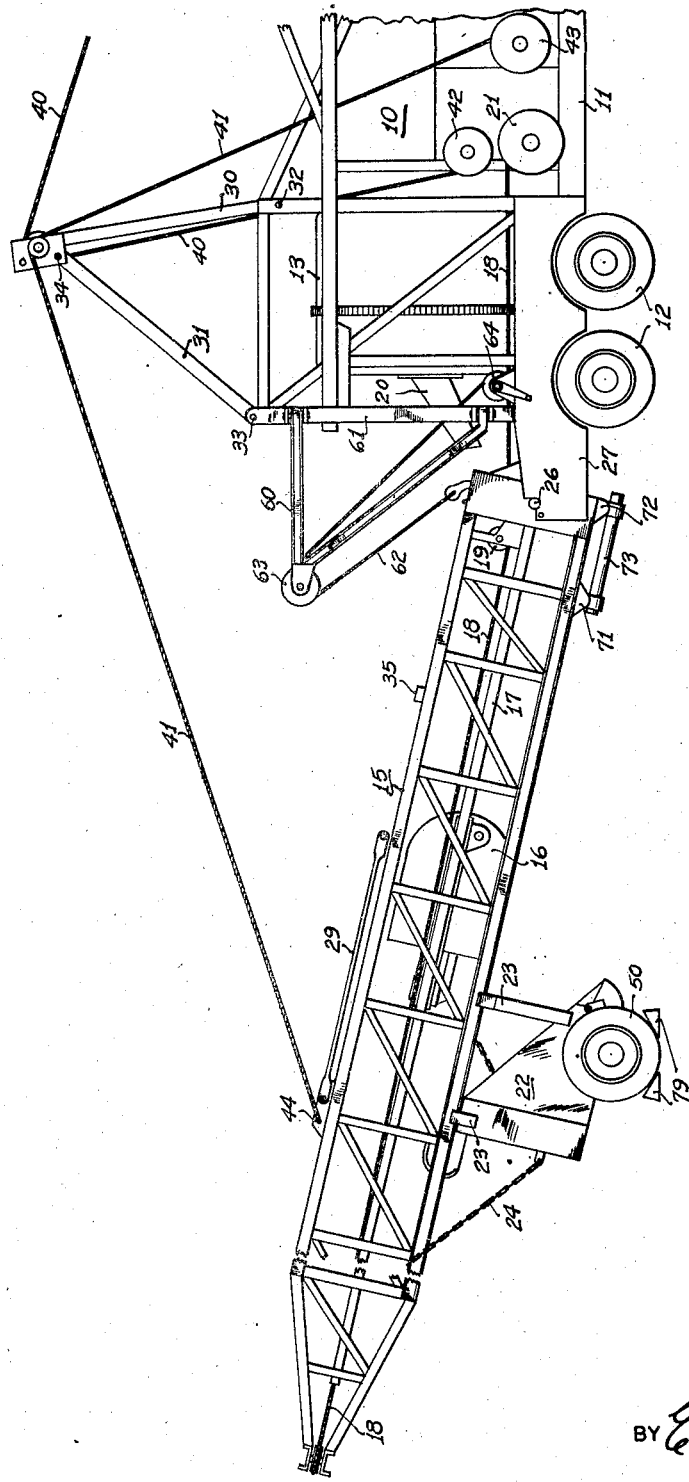

2,385,748

UNITED STATES PATENT OFFICE 2,385,748

VEHICLE MOUNTED TOWER

Harold A. Wagner and Gustave H. Wagner, Portland, Oreg.

Application October 19, 1943, Serial No. 506,851

9 Claims. (Cl. 214—120).

The present invention relates to vehicle mounted tower structures and, while not necessarily limited thereto, it is particularly applicable to tower structures adapted for hoisting material.

Mobile hoisting towers are generally mounted upon the supporting vehicle in such a manner that the tower may be pivotally lowered to a horizontal position overlying the vehicle in which position the tower is transported from one location to another. Occasionally it may be necessary to remove the tower such as when it is desired to use the vehicle without the tower attached. But with the ordinary tower structures it is a rather difficult matter to lift such a superimposed tower from the vehicle underneath without the use of cranes or other hoisting means. It is desirable, therefore, to provide a mobile tower arrangement in which the tower can readily be removed from the supporting vehicle without requiring any auxiliary means other than that provided on the vehicle itself.

Frequently a hoisting tower is provided as a unit of a larger machine or apparatus mounted on the vehicle, such as a mobile concrete mixing plant, in which case, the tower is used for hoisting the mixed concrete to desired heights. If both the machine and the tower are of relatively large dimensions then the overall height of the superimposed combination frequently exceeds clearance limitations of the right-of-ways. It is, therefore, a general object of the present invention to provide a mobile hoisting tower arrangement which may readily be transported in the lowered position over any ordinary roads and which may readily be removed from the vehicle without the need for any additional equipment.

A further object of the invention is to provide a new and improved mobile tower arrangement in which the tower unit is adapted to be trailed behind the vehicle with which it is to be used, the tower unit being, furthermore, so constructed as to enable the raising and lowering thereof upon the vehicle with minimum time and effort.

The invention has for another object the provision of an improved arrangement for supporting an elevator tower unit upon a mobile vehicle.

An additional object resides in the provision of a new and improved arrangement for towing an elevator tower unit behind a prime mover vehicle.

In accordance with the presently described embodiment, the tower unit is pivotally supported upon rearwardly extending side frame portions of the vehicle. The vehicle frame includes a foldable superstructure for bracing the tower unit in the vertical or upright position which, when disconnected from the tower, permits pivotal movement of the tower rearwardly of the vehicle under the control of a cable connected to a winch drum on the vehicle. A pair of wheels secured to a mid-portion of the tower supports the outer end of the tower upon the ground when in the lowered position. Means are provided for securing the base portion of the tower to the rear of the vehicle so that the tower may readily be towed behind the vehicle in the manner of a trailer. With the particular arrangement shown connection and disconnection of the tower from the vehicle, as well as the raising and lowering thereof, may be accomplished in a relatively short period of time without requiring the use of any additional equipment or apparatus.

Further objects and advantages of the invention will appear in the following description taken in connection with the accompanying drawings, while the features of novelty will be pointed out with greater particularity in the appended claims.

In the drawings Fig. 1 is a side elevation of the vehicle mounted elevator tower structure constructed in accordance with one form of the invention and illustrated in the upright or operative position; Fig. 2 is a sectional view taken along the line 2—2 of Fig. 1; Fig. 3 is a side elevation of the apparatus illustrating the tower structure in the lowered or inoperative position; Fig. 4 is a side view illustrating the tower structure in position for towing behind the vehicle; Fig. 5 is an enlarged fragmentary view taken along the line 5—5 of Fig. 4.

Referring first to Fig. 1 of the drawings, a mobile concrete mixing plant is indicated generally at 10 mounted upon a vehicle framework 11 having rear wheels 12, the forward portion of the vehicle structure being omitted in the drawings for purposes of greater clarity. The plant includes a mixer drum 13 mounted longitudinally of the frame 11 and is adapted to be driven by a prime mover engine (not shown) arranged in the forward portion of the vehicle. The plant also includes a plurality of power driven winch drums, to be referred to more fully hereinafter, for operating various portions of the machine. The prime mover engine arrangement and the drive mechanism extending therefrom to the different operative portions of the plant are described more completely in our co-pending patent application entitled Mobile concrete mixing plant, Serial Number 506,851, filed October 19, 1943.

An elevator tower structure indicated generally at 15 is mounted upon the rear end of the mixer plant and is provided with an elevator bucket 16 which is adapted to receive successive batches of concrete from the discharge chute 20 extending from the rear end of drum 13 and hoist such batches upwardly within the tower to a predetermined desired height. The bucket 16 is mounted within a suitable carriage slidably arranged upon a pair of opposite guide rails 17 and is raised and lowered by means of a cable 18 connected to the carriage trained over suitable sheaves in the top of the tower and sheave 19 mounted in the base of the tower from whence the cable extends to a winch drum 21 mounted upon the concrete mixer plant and coupled for driving by the prime mover motor. Mounted upon the front of the tower is a hopper 22 into which the successive batches of concrete are dumped from the bucket 16. The hopper 22 is provided with suitable guide means 23, as shown more clearly in the view of Fig. 2, slidably engaging the front uprights of the tower structure, the hopper 22 being secured in a desired position by means of chains 24. The tower may be of an open face type such as that described in the Patents 2,327,476 and 2,327,477, issued August 24, 1943, to which reference may be had for further specific information as to details of construction, not only of the tower, but also as regards the specific bucket arrangement 16 and the hopper 22 as shown. It will become obvious, however, as the present description proceeds that the instant invention is not dependent upon any particular tower structure.

In the ordinary mobile concrete mixer provided with a bucket elevator tower, and as in the case of the disclosures of the patents referred to above, the tower structure is hingedly mounted upon an upper portion of the concrete mixer framework and is adapted to be lowered by pivoting the upper end of the tower forwardly over the top of the concrete mixer in which position the tower is transported from one location to the next. While such an arrangement for transporting the tower is quite satisfactory for the smaller size concrete mixer machines, it is not suitable in the case of large size mixing plants where the overall height of the vehicle with tower lowered in such superposed position would be excessive.

As distinguished from the mobile tower structures of the type referred to in the immediately preceding paragraph, the tower structure of the present invention is adapted to be pivoted rearwardly relative to the vehicle from the upright to the lowered position and towed behind the mixer vehicle in the manner of a trailer. A pair of trunnions 26 secured to the opposite sides of the base of the tower substantially centrally as regards the tower width extend outwardly at right angles from the tower and are cooperatively seated in bearing sockets provided in the outer ends of the rearwardly extending side frame portions 27 of the framework of the mixer plant. The trunnions are normally retained in the sockets by suitable removable retaining members 28. The tower is secured in the upright position as shown in Fig. 1 by means of a pair of rigid braces 29 pinned at one end to the rear uprights of the tower structure and at the other end to the collapsible superstructure comprising pairs of arms 30 and 31. The arm 30 is pivotally secured as at 32 to a rigid forward portion of the framework for the mixer plant while the arm 31 is pivotally connected as at 33 to a rigid portion at the rear end of the mixer framework. The upper end of the arm 31 is secured by a removable pin 34 to the head of the arm 30. In the upright position of the tower, blocks 35 secured to the rear tower uprights engage with cooperating stops provided on the rearmost portion of the mixer framework adjacent the upper end thereof. At the upper ends of the arms 30 are mounted a pair of sheaves over which are trained a pair of cables 40 and 41, the cable 40 extending from the winch drum 42 up over the corresponding sheave and forwardly of the mixer plant for operating the loading skip for charging successive batches of raw material into the mixer drum. Since this part of the mixer plant is not involved in the present invention, the drum charging means has been omitted from the drawings. The cable 41, however, extending from the winch drum 43 on the mixer plant is connected to the tower as indicated at 44 and serves for raising and lowering the tower structure 15 between the horizontal and vertical positions. While not essential, it is preferred that the winch drum 43 be driven as through a worm gear as a safety measure in connection with the tower raising and lowering operations.

For stabilizing the tower in the upright position, a jack 45 is secured under each of the side frame extensions 27, having base portions which may be moved into engagement with the ground prior to erection of the tower.

For lowering the tower, the brace arms 29 are disconnected from the head of the arms 30 and cable 41 let out permitting the tower 15 to pivot rearwardly about the trunnions 26 at the base thereof. In Fig. 3 the tower structure is shown lowered to the inoperative or horizontal position.

For supporting the upper end of the tower structure in the horizontal position and providing a trailer running gear therefor, a pair of wheels 50 rotatably mounted upon an axle 51 are secured to the forward wall of the hopper 22. It may be desirable before lowering the tower to the inoperative position to, first, adjust the position of the hopper to a point toward the center thereof, in which position it may be secured by means of the chain 24, one of which may be connected forwardly of the tower and the other connected rearwardly thereto in order to prevent relative movement therebetween.

It will be observed that the superstructure arm members 30 and 31 serve not only to provide points of anchorage for the tower in the erected position, but also provide the necessary lever arm for the cable 41 to facilitate the raising and lowering of the tower unit.

After the tower has been lowered the base is then lifted from the vehicle frame and suitably coupled thereto for towing. For lifting the base of the tower unit and raising the trunnions 26 from the bearing seats in the vehicle frame extensions a relatively small swinging boom 60 is pivotally mounted onto the rear frame member 61 of the mixer plant. Normally, when not in use, the boom 60 is folded forwardly against the side of the mixer framework as illustrated in Fig. 1. In Fig. 3 the boom is shown swung rearwardly and having a cable 62 trained over sheave 63 in the end thereof and suitably connected to a transverse member of the tower base. The opposite end of the cable 62 is secured to a small winch drum 64 mounted on the mixer frame which may be provided with a crank handle for manual operation. The retaining members 28 are first removed from above the tower trunnions 26 and the base of the tower lifted from the mixer frame.

Referring particularly to the view of Fig. 5, the hitch arrangement provided for coupling the tower onto the mixer vehicle for towing will be described. A yoke unit comprising a transverse bar 67 is provided with trunnions 68 in the opposite ends thereof and which are adapted to be placed into the bearing seats in the ends of the side frame extensions 27 of the mixer vehicle. Extending rearwardly from the center of the bar 67 is a clevis 69 which is adapted to receive the end of a tongue 70 removably attached to the base of the tower. Extending transversely across the front side of the tower adjacent the base thereof are a pair of members 71 and 72 to which is secured a sleeve member 73 extending longitudinally of the tower. The tongue 70 may be a length of pipe which is slid through the sleeve 73 and secured thereto by a removable pin 74. The tongue 70 may be secured to the clevis 69 by means of the pin 75. To restrict turning of the bar 67 about the trunnions 68 the bar is provided with an arm 76, the foremost end of which is fitted into a cooperating slot provided in the transverse mixer frame member 77. After the tower trunnions are lifted from the bearing seats on the mixer frame, it is necessary to drive the vehicle slightly ahead to provide a space between the rear end of the vehicle and the base of the horizontal tower for the attachment of the towing coupling. The wheels 50 supporting the tower mid-section may be blocked as at 79 to prevent rolling thereof during this operation.

After the tower is coupled to the rear end of the mixer vehicle in the manner shown, the hoist cable 62 may be disconnected therefrom and the boom 60 swung back alongside the mixer in the inoperative position and suitably secured in place for traveling. With a large portion of the weight of the tower thus removed from the mixer framework, the feet of the jacks 45 will be lifted free of the ground and the telescopic section may be raised and secured in such position. The superstructure frame members 30 and 31 may then be disconnected from each other by removal of the connecting pin and these arms folded down to an inoperative position as illustrated in Fig. 4. The cable 41 need not be disconnected from the tower but merely slackened slightly so as not to interfere with the trailing movement of the tower relative to the mixer vehicle during travel. The same is true with regard to the bucket hoisting cable 18. By leaving these cables connected considerable time is saved with regard to the setting up and taking down operations.

By trailing the tower behind the mixer vehicle instead of carrying it on top, the overall height of the plant in traveling condition may be reduced to a point safely within normal clearance limitations of highways.

The setting up operation for the tower unit is substantially the reverse of the procedure described and may be accomplished within a very short period of time. By use of the swinging boom 60 the trailer hitch may be readily removed and the base of the tower fitted into the rear end of the mixer framework. The trailer hitch elements 67 and 70 may be stowed in a convenient place upon the mixer until they are to be used again. The jacks 45 are then dropped into engagement with the ground, the superstructure arms 30 and 31 are then erected and the tower thereafter raised to the vertical position and locked in place by the braces 29.

In the structure described a pair of wheels are provided on the hopper unit 22 of the tower and which unit serves additionally as a trailer carriage during transportation of the tower from one location to the next. It will be readily apparent that the wheels and axle combination may be provided as a separate unit and removably attached to the tower structure when the tower is lowered for transportation.

It will be obvious that in case it is desired to use the concrete mixing plant without the elevator tower, the elevator tower may readily be disconnected therefrom with a minimum of time. By use of the swinging boom 60 the base end of the tower may quickly be lowered onto the ground and the various cables extending to the tower structure disconnected. It will be observed that the side frame portions 27 extending rearwardly from the rear end of the vehicle are spaced apart a suitable distance so as to provide no obstruction for the approach of wheeled vehicles, such as trucks, wheelbarrows or other concrete hauling apparatus, to the discharge chute 20 extending from the rear end of the concrete mixer drum.

Having described the invention in what is presently considered a preferred embodiment thereof, it will readily be understood by those skilled in the art that various changes may be made with regard to the various specific details herein presented. Such details as shown and described are for illustrative purposes only and it is intended in the following claims to cover all such variations and modifications as fall within the true spirit and scope of the invention.

We claim:

1. A mobile concrete mixing apparatus comprising a vehicle frame, a mixer drum mounted on said frame, a pair of opposite side frame portions extending rearwardly behind said vehicle, an elevator tower unit, a pair of trunnions extending outwardly from the opposite sides of the base portion of said tower unit, bearing seats in said side frame portions for cooperatively receiving said trunnions, a hoist bucket on said tower, chute means for loading concrete mix from said drum into said bucket, said chute means extending between said side frame portions, said tower being removable from said side frame portions to provide access therebetween to said chute for other concrete conveying apparatus.

2. A mobile concrete mixing plant including a vehicle frame, a tower unit mounted upon the rear end of said frame, trunnions secured to the base of said tower unit and seated in cooperating bearings provided in rearward extensions of said vehicle frame, hinged arm means extending upwardly from the upper portion of said vehicle frame and adapted to be connected to said tower for steadying said tower in the upright position thereof, a cable extending over the upper end of said arm means and connected to said tower for effecting raising and lowering of said tower between a horizontal position extending rearwardly of said frame and the upright position upon said frame.

3. A mobile vehicle, a tower unit, a pair of trunnions on the base of said tower, a pair of bearing seats on the rear end of said vehicle for cooperatively receiving said trunnions and supporting said tower unit for pivotal movement between lowered and upright positions, the axis of said trunnions and said seats extending transversely of said vehicle, said tower unit in the lowered position extending rearwardly behind said vehicle, means for supporting the base of said tower upon said bearing seats for pivotal movement in the horizontal direction when in said lowered position, and a wheel unit for supporting the end of said tower remote from said vehicle to permit towing of the lowered tower unit behind said vehicle.

4. A mobile vehicle, a hoisting tower unit, pivot means supporting said tower unit upon said vehicle for pivotal movement between lowered and upright positions, said tower unit in the lowered pivotal position extending rearwardly behind said vehicle, means mounted upon said tower for receiving material hoisted thereby, and wheels mounted upon said last mentioned means for supporting the end of said tower upon the ground when moved to the lowered position.

5. A mobile vehicle, a hoisting tower unit, pivot means supporting said tower unit upon said vehicle for pivotal movement between lowered and upright positions, said tower unit in the lowered pivotal position extending rearwardly behind said vehicle, bucket means within said tower for hoisting material, a hopper mounted upon said tower for receiving material from said bucket, wheels secured to said hopper, said wheels engaging with the ground upon movement of said tower to the lowered position.

6. A mobile vehicle, a hoisting tower unit pivot means supporting said tower unit upon said vehicle for pivotal movement between lowered and upright positions, said tower unit in the lowered pivotal position extending rearwardly behind said vehicle, bucket means within said tower for hoisting material, a cable extending from said vehicle arranged over said tower and connected to said bucket means for effecting raising and lowering thereof, a hopper mounted upon said tower for receiving material from said bucket, wheels secured to said hopper, said wheels engaging with the ground upon adjustment of said tower unit to the lowered position thereof, and means for pivotally supporting the base end of said tower unit in the lowered position thereof upon the rear end of said vehicle and for pivotal movement in the horizontal direction.

7. A mobile vehicle, a tower unit, a pair of trunnions extending outwardly from the base of said tower unit, bearing seats on said mobile vehicle for cooperatively receiving said trunnions, means on said vehicle for raising and lowering said tower unit about said trunnions, and means on said vehicle for lifting said trunnions from said bearing seats in the lowered condition of said tower unit.

8. A mobile vehicle, a tower unit, bearing seats on said vehicle for receiving cooperating portions on the base of said tower unit, said tower unit being pivotally movable about said bearing seats from a lowered to the raised position, and means on said vehicle for lifting said tower from said seats during the lowered condition of said tower.

9. A mobile vehicle, a tower unit, pivot means for supporting the base of said tower upon said vehicle for pivotal movement between lowered and upright positions, said tower unit in the lowered pivotal position extending rearwardly behind said vehicle, hoist means on said vehicle for engaging with the base portion of said tower unit in the lowered position thereof and raising it from said pivot supporting means on said vehicle.

HAROLD A. WAGNER.
GUSTAVE H. WAGNER.